May 23, 1972 H. E. SEELEY, JR 3,664,648
METHOD AND APPARATUS FOR MIXING AND METERING FUEL
IN AN INTERNAL COMBUSTION ENGINE
Filed April 20, 1970 2 Sheets-Sheet 1

INVENTOR
HARVEY E. SEELEY, JR.
BY
ATTORNEYS

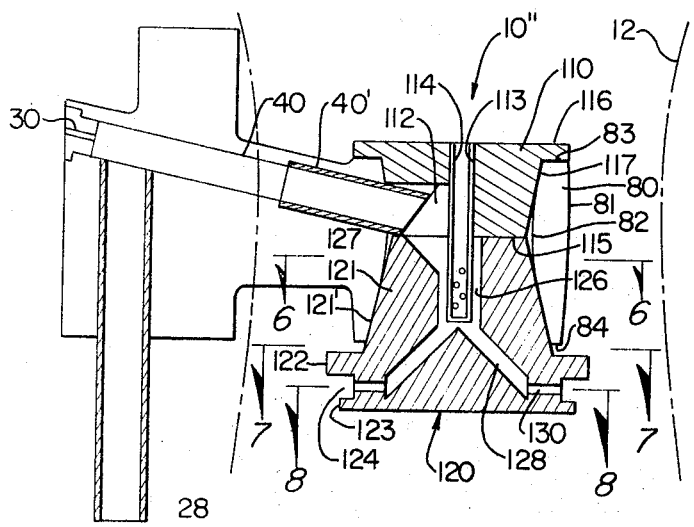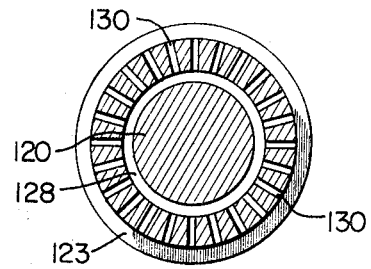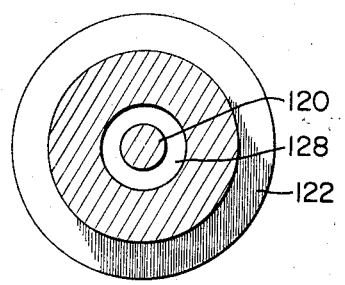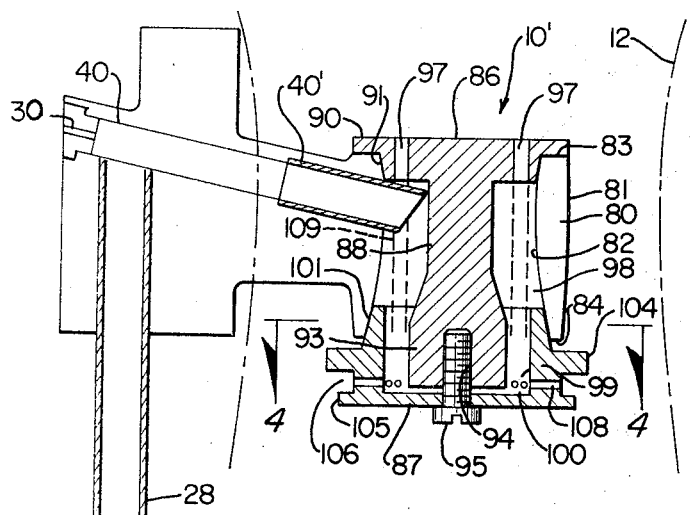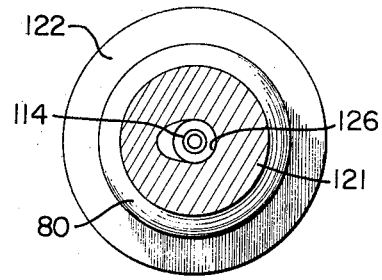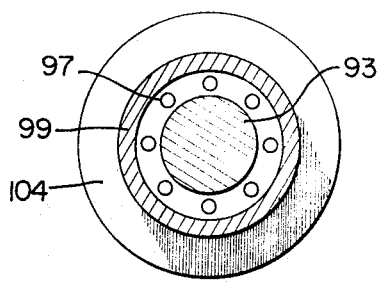

United States Patent Office 3,664,648
Patented May 23, 1972

3,664,648
METHOD AND APPARATUS FOR MIXING AND METERING FUEL IN AN INTERNAL COMBUSTION ENGINE
Harvey E. Seeley, Jr., Aurora, Colo., assignor to American Pollution Controlled, Inc., Aurora, Colo.
Continuation-in-part of application Ser. No. 803,168, Feb. 28, 1969. This application Apr. 20, 1970, Ser. No. 29,874
Int. Cl. F02m 7/02
U.S. Cl. 261—41 R
24 Claims

ABSTRACT OF THE DISCLOSURE

An improved method and means are disclosed for mixing liquid fuel with air for discharge in metered quantities into the airstream of a carburetor or other air induction passage of an internal combustion engine. The liquid fuel is induced to flow through a delivery tube for mixture with air by the negative pressure differential developed across a series of small discharge orifices which are so spaced and arranged in the airstream as to disperse metered quantities of the fuel/air mixture into the airstream with a high degree of lateral penetration. The forms of devices disclosed achieve extremely fine atomization, mixing and dispersion of the liquid fuel with air to the extent of effecting substantially complete foaming of the fuel/air mixture as it is discharged into the airstream, making it possible to schedule leaner fuel/air ratios which will remain constant over a wide range of speed and resulting in more complete combustion and a substantial reduction in the amount of pollutants exhausted from the engine.

Figure 1:
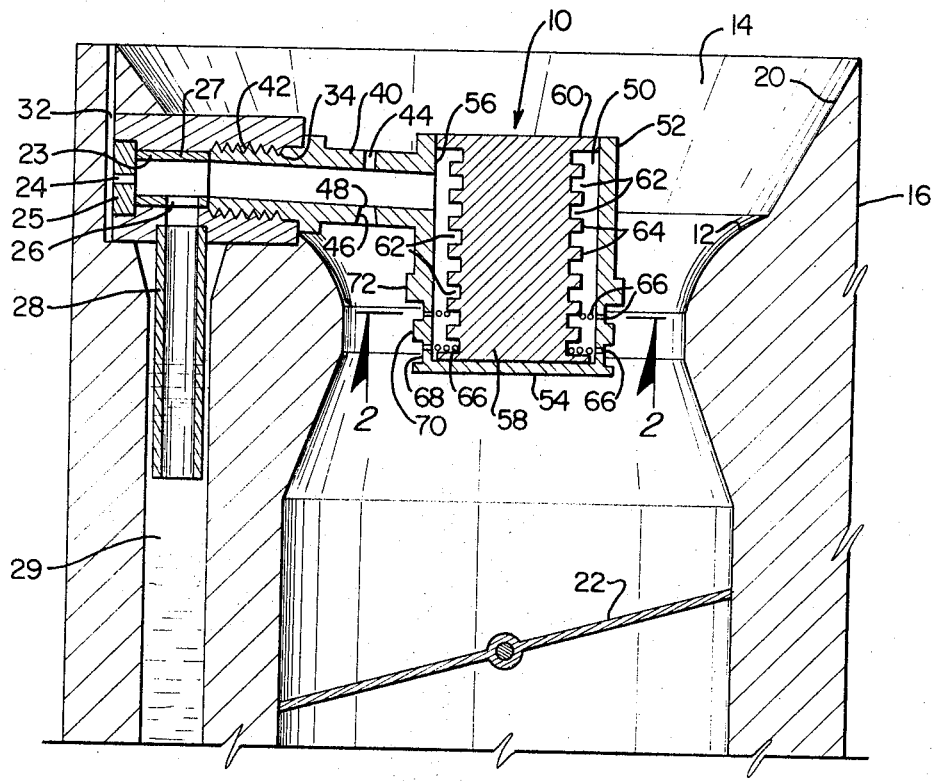

This invention relates to novel and improved methods and means for mixing fuel and air; and more particularly relates to improved methods and means for regulating the quality and state of a combustible liquid fuel and air mixture which is to be discharged into the airstream of a carburetor or other air induction passage in an internal combustion engine. This application is a continuation-in-part of application Ser. No. 803,168 for Fuel Atomizer for Internal Combustion Engines, filed Feb. 28, 1969, now abandoned.

Typically in carburetors used in high performance internal combustion engines, the liquid fuel is drawn from a reservoir into a riser tube, mixed with combustion air, and the resultant fuel/air mixture is then delivered through a tube for discharge from an open-ended, hollow cylindrical member located concentrically within the carburetor venturi. The airstream moving at a high velocity through the venturi is intended to break up the liquid fraction of the fuel/air mixture before it enters the intake manifold for distribution to the cylinders to be burned. In order to achieve most complete and efficient combustion, the carburetor must be capable of metering the fuel to form the correct fuel/air mixture for all loads and speeds of the engine and of sub-dividing or atomizing the liquid fuel with air to form a mixture which will be readily vaporized in the airstream and uniformly distributed to all cylinders of the engine. Accordingly, the fuel/air mixture formed should be homogenous throughout to permit development of maximum power with maximum economy under all conditions of engine operation, such as, for instance, cold starting and warming up, idling, rapid acceleration and high speed operation.

Previous attempts have been made to devise fuel vaporizers and fuel atomizers capable of producing increased combustion efficiencies in internal combustion engines. These efforts have been intensified by the knowledge that most complete and efficient combustion of the fuel will greatly minimize the amount of pollutants formed and exhausted by the atmosphere. To this end, the fuel and air must be thoroughly mixed and metered to supply predetermined schedules of fuel/air ratios as the quantity of air passing through the carburetor airstream varies, and the fuel must be widely dispersed into the airstream in a state which will most readily assist in its vaporization in the airstream.

It is therefore an object of the present invention to provide a novel and highly efficient method of achieving extremely fine atomization, dispersion and mixing of liquid fuel with air in an internal combustion engine which will lead to rapid vaporization utilizing leaner and more unform fuel/air mixtures; further, wherein a predetermined schedule of fuel/air ratios is established without adversely affecting performance of the engine under virtually all conditions of operation.

It is another object of the present invention to provide novel and improved method and means for mixing and metering a liquid fuel with combustion air in the airstream of a carburetor or other air induction passage in an internal combustion engine, said method and means being capable of producing more complete and efficient combustion of the fuel with a substantial reduction in pollutants formed and exhausted into the atmosphere.

A further object of the present invention is to provide a device for regulating the quality and state of a fuel/air mixture in an internal combustion engine that readily replaces the tubular fuel injector in the venturi of most conventional carburetors and is capable of producing a homogenous, substantially constant fuel/air mixture over virtually all conditions of engine operation, is readily conformable for use in various carburetion systems for atomization and dispersal of liquid petroleum fuels and which when installed requires no adjustment or maintenance.

It is a still further object of the present invention to provide an attachment which can be readily installed in the main air induction passage of a standard carburetor to increase the efficiency and economy of an internal combustion engine.

It is an additional object of the present invention to provide for a liquid fuel mixing device for internal combustion engines which is compact, rugged, easily installed, inexpensive, versatile and readily interchangeable for use in various carburetion systems, without interfering with other normal operations of the carburetion system or engine.

It is yet an additional object to provide in a fuel/air mixing device for novel and improved means for mixing liquid fuel in the idling speed range of an internal combustion engine and is further adaptable for use with existing devices of the type described for increasing efficiency of combustion under all conditions of engine operation.

In accordance with the present invention, a preferred device for regulating the fuel/air mixture discharged into the main air induction passage of an internal combustion engine includes a liquid fuel delivery conduit leading from a fuel supply source into the main induction passage and across the path of air flow through the passage. A chamber at the discharge end of the conduit is responsive to the flow of air through the air induction passage to induce the mixed flow of fuel from the fuel supply source and of air through an air intake opening in communication with the conduit and to meter the resultant fuel/air mixture for discharge in a foamed state into the airstream. Most desirably the discharge chamber is positioned concentrically within the main air induction passage and is provided with a plurality of closely-spaced discharge orifices in its outer periphery with an external flange located directly upstream of the orifices to cooperate in establishing a negative pressure differential across the discharge orifices of sufficient magnitude to induce a predetermined schedule of fuel/air ratios through the chamber for discharge in metered quantities into the airstream. The discharge orifices are so dimensioned and arranged with respect to the delivery conduit and mixing chamber as to achieve extremely fine atomization and mixing of the liquid fuel with the air to the extent of converting the liquid fuel into a foam in which the finely divided particles of fuel each forms a film or bubble, and the fuel is maintained in this foamed state as it is discharged into the airstream. Moreover, the arrangement of the orifices is such that the fuel is discharged at a sufficiently high velocity to insure the widest possible dispersal and lateral penetration into the airstream.

Foaming of the fuel as a preliminary to discharge into the airstream is greatly enhanced by positioning one or more air intake ports in the path of the airstream, for example, on the upstream side of the fuel delivery conduit or of the mixing chamber. In this relation, disposition of an air intake port with an aligned discharge port in the delivery conduit, where the ports are disposed in the path of the airstream, has been found to serve as a highly effective means of atomizing and discharging the fuel into the airstream when the engine is idling; and as the engine speed increases the discharge port further cooperates with the intake port or ports for the controlled introduction of air into the fuel in creating a foam, followed by introduction of the foam into the airstream through the discharge orifices.

The mixing device of the present invention may be manufactured as a complete unit and installed in an existing carburetor body; or, in the alternative, where the carburetor includes an inner venturi, the inner venturi may be readily converted by the simple expedient of enclosing opposite ends of the venturi with specially constructed caps, the cap on the upstream side provided with one or more air intake ports and the cap on the downstream side provided with a series of closely spaced discharge orifices as described. In still another modification, the air intake ports may be provided with tubular extensions to conduct the air through the venturi to a point at or near the discharge orifices for preliminary mixing with and foaming of the fuel. The method devised in accordance with the present invention comprises induction of air from the airstream into the delivery passage for the fuel through one or more parts intercepting the flow of air through the induction passage; and in association therewith passing air from the airstream through the fuel delivery passage to withdraw and discharge fuel into the induction passage at idling speeds ahead of the normal discharge zone established for higher engine speeds.

The foregoing and other objects, advantages and features of the present invention will become more readily understood from a consideration of a more detailed description of alternate forms of the present invention when taken together with the accompanying drawings, in which:

FIG. 1 is a fragmentary diametrical section view of one form of the present invention installed in place in the venturi of a combustion engine carburetor.

FIG. 2 is a horizontal section of the form shown in FIG. 1 and taken about lines 2—2 of FIG. 1.

FIG. 3 is a diametrical section view of another form of the present invention installed within the inner venturi of an internal combustion engine carburetor, the conventional parts of the system being schematically shown.

FIG. 4 is an end view of the form shown in FIG. 3.

FIG. 5 is a diametrical section view of still another form of the present invention installed in the inner venturi of a conventional internal combustion engine carburetor, again the conventional parts being schematically shown.

FIG. 6 is a sectional view taken about lines 6—6 of FIG. 5.

FIG. 7 is a sectional view taken about lines 7—7 of FIG. 5; and

FIG. 8 is a sectional view taken about lines 8—8 of FIG. 5.

Referring in more detail to the drawings, one form of fuel mixing device in accordance with the present invention is illustrated in FIGS. 1 and 2 wherein the device as designated broadly by reference numeral 10 is mounted in the throat 12 of a conventional internal combustion engine carburetor venturi 14 in place of the usual fuel injector, not shown. As illustrated, the carburetor represented at 16 is of the down-draft type and conventionally includes the venturi 14 or other main induction passage which is slightly flared at its upper end as it opens into a chamber 20; also, a conventional throttle valve 22 is positioned downstream of the throat and ahead of the air intake manifold, not shown. In a conventional manner, and as presented at FIG. 1, one portion of the chamber wall is recessed for disposition of a fuel/air mixing subassembly which, as a setting for the present invention, suitably includes an outer horizontally disposed sleeve 23 defining a through-bore having an air bleed opening 24 in a plug 25 at one end of the bore, the opening 24 being in communication through a connecting air intake 32 with the atmosphere.

A fuel intake passage 26 extends vertically through the lower wall of the sleeve 23 and through an inner tubular conduit 27 inserted in a smooth-surfaced portion of the bore adjacent to the opening 24, and a riser tube 28 extends downwardly from the passage 26 into a well 29 which is partially filled with liquid fuel, for example, to the level represented in the drawing and where the fuel is suitably drawn from a float-controlled reservoir, not shown.

It will be noted that the inner end of the bore of sleeve 23 is internally threaded as at 34, and in the past has been utilized to receive a fuel delivery tube that supports the ordinary fuel injector positioned within the throat 12 of the venturi 14, neither the aforementioned tube or injector having been illustrated for the reason that the device of the instant invention replaces same. Again, the carburetor thus far described is conventional and merely representative of various types of carburetors with which the mixing device of the present invention may be associated, and accordingly parts thereof are described merely for the purpose of illustration and not limitation.

In accordance with the present invention, a fuel delivery conduit or tube 40 is externally threaded at 42 for connection into the threaded end 34 of the sleeve 23 and with the delivery conduit 40 projecting transversely into the venturi directly upstream of the throat section 12 so as to intercept the path of air flow through the venturi. An annular mixing and foaming chamber 50 is positioned concentrically within the venturi and extends axially in a downstream direction from the inner terminal end of the delivery conduit. An upwardly opening air intake port 44 is located in the delivery tube 40 directly ahead of the chamber 50 in the path of air flowing through the venturi; and on the underside or downstream side of the delivery tube 40 is a downwardly directed, flared discharge orifice 46 which is axially aligned with the intake port 44 and is provided with a sharp edge 48 at its juncture with the inner wall surface of the delivery conduit 40.

Figure 2:
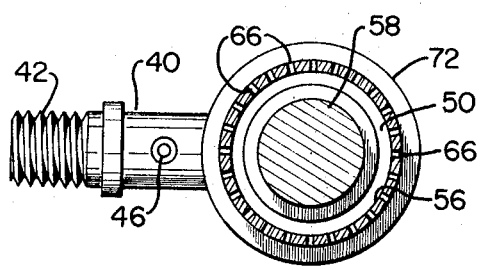

The terminal end of the delivery conduit is shown communicating with the upstream end of the mixing chamber 50. In FIGS. 1 and 2, the chamber 50 is defined by a hollow cylindrical outer casing 52 fitted with a bottom end cap 54 which serves both to close the lower end and cooperate with the smooth-surfaced interior wall 56 of the casing to define a cup-shaped cavity. Positioned concentrically within the cup-shaped cavity is a solid core 58 provided with a radially extending peripheral flange 60 at its upper or upstream end which forms a closure across the upstream end of the chamber.

Except for the flange 60 which is designed to fit tightly inside the cavity and to seal against the smooth-surfaced inner cylindrical wall 56, the maximum diameter of the rest of the core is less than the inside diameter of the outer casing, and its external surface is provided with vertically spaced parallel annular grooves 62 formed by a corresponding series of parallel annular ribs 64. Preferably, the ribs 64 are given sharp corners as shown which project into the annular chamber 50.

Adjacent to the lower end of the cup-shaped cavity in the casing are closely spaced rows of tiny discharge orifices 66 that are spaced circumferentially in closely spaced relation to one another around the outer hollow cylindrical casing 52. The discharge orifices project laterally through the wall of the casing from communication with the chamber, each row of orifices communicating with an external annular groove 68, there being a pair of grooves 68 separated by an external annular rib 70. Another external annular rib 72 of greater depth than the rib 70 projects laterally from the external wall of the casing in overhanging relation to, or upstream of, the upper row of orifices 66 with the lower rib 70 overhanging the lower row of orifices. Projection of the ribs laterally into the airstream and upstream of the orifices causes the airstream to undergo a change in direction in passing across the ribs to create a substantial void in the grooves 68 and establish a negative pressure differential across the orifices between the inner chamber 50 and the space along the grooves 68 as well as to develop increased turbulence in the air flow past the ribs.

In the case of a single row of orifices 66, an overhanging ledge produced from the formation of an external groove in the wall of the casing will to some extent generate turbulence and a negative pressure differential across the orifices; however, the additional provision for an external rib, such as, the rib 72, projecting into the airstream and upstream of the row of orifices materially contributes to the negative pressure differential developed.

At idling speeds, the passage of air from the airstream in relatively low velocities through the intake port 44 and aligned discharge port 46 will induce the flow of fuel upwardly through the riser tube 28 into the delivery conduit together with limited amount of air drawn through the intake passage 24 It is believed also that a negative pressure differential is established transversely of the delivery tube between the intake and discharge ports 44 and 46 resulting at least in part from the increased velocity of the airstream passing through the throat 12 of the venturi, thereby drawing air through the aligned ports 44 and 46 which intercept the fuel/air mixture passing through the delivery conduit and carries the fuel/air mixture through the discharge orifice 46 directly into the airstream. Further, the air passing around the outside of the delivery tube may also contribute to the development of a negative differential pressure tending to draw the fuel/air mixture directly from the delivery conduit through the discharge port 46 and to bypass the discharge orifices at the idling and lower speed ranges. The sharp annular edge 48 at the entry into the discharge port also serves to cooperate in dividing the fuel into finely divided liquid particles intimately mixed with the air while passing through the aligned ports. Under increasing engine speeds and resultant increases in the velocity of air passing through the main air induction passage, the negative pressure differential established across the discharge orifices 66 will become substantially greater than that across the aligned ports 44 and 46 to progressively increase the weight rate of flow of the fuel/air mixture through the delivery conduit past the aligned ports 44 and 46 and into the annular chamber 50. The negative pressure differential developed at the orifices will also be sufficient to draw air directly from the airstream through the air intake port 44 and the downstream port 46, the latter gradually converting from a discharge port into an air intake port as the flow of the fuel/air mixture through the conduit is increased. The induced flow of air directly from the airstream into the conduit or upstream side of the chamber serves to reduce the proportionate amount of fuel in the mixture and to at least partially gasify and foam the fuel in the conduit and as it passes through the annular chamber 50. Stated another way, the fuel/air mixture takes the form of bubbles with the fuel forming a thin film, as opposed to solid droplets, which can be more readily vaporized and thoroughly mixed with the air flowing through the main air induction passage. Thus, it is important that the fuel/air mixture be foamed directly ahead of this joint of discharge and that it be maintained in a foamed state as it is directed outwardly through the discharge orifices into the airstream. Moreover, utilization of a maximum number of extremely small orifices 66 enables closer control over the fuel/air ratio established, and the orifices are capable of metering the flow of fuel into the airstream. Still further, the discharge orifices effect a wide dispersal as well as homogenous mixing of the fuel with the main airstream by directing it laterally and outwardly through a great plurality of openings closely spaced circumferentially around the chamber and bring about increased lateral penetration of the fuel discharged into the airstream.

For the purpose of illustration but not limitation, the following representative dimensions will serve to exemplify the relative sizes and proportions between certain parts and elements comprising the form of device shown in FIGS. 1 and 2. For a delivery conduit 40 provided with a one-eighth inch bore, satisfactory results were achieved when the diameter of the intake port 44 of the discharge port 46 at its inner edge 48 was approximately 0.03 to 0.08 inch in diameter, the intake and discharge ports being aproximately equal in diameter and the discharge port 46 flaring outwardly at an angle of 30° with respect to its center line. Obviously, these dimensions will vary somewhat depending upon the volume of air flowing therethrough and around the delivery conduit at low engine speeds and the efficiency of the carburetor in developing a negative pressure differential between the port 44 and port 46 of sufficient magnitude to draw the major portion of the liquid fuel constituent directly into the throat of the venturi. Also, a satisfactory balance must be reached between the relative size of the intake and discharge ports 44 and 46 to that of the delivery conduit to establish the desired fuel/air ratio. For the purpose of comparison, in a high compression engine having a displacement of approximately 420 cubic inches the outside diameter of the hollow cylindrical casing 52, less the thickness of the rib 72, was on the order of 0.7 inch with a length on the order of 0.8 inch. The inside diameter of the casing in which the core is placed was 9/16 inch while that of the ribs 64 was approximately 0.46 inch so that the chamber 50 was about 0.1 inch wide when measured to the top of the ribs or lands and about 0.127 inch when measured to the bottom of groove 62, the latter being approximately 0.027 inch deep. The ribs 64 and grooves 62 were approximately the same width, namely, about 0.055 inch where the core included a total of approximately seven ribs and eight grooves as shown. The grooves 68 in the casing were more on the order of 0.027 inch in depth, nearly 0.055 inch wide and spaced apart roughly this same distance. The discharge orifices 66 were given a diameter of approximately 0.030 inch, there being anywhere from 30 to 40 orifices in each row.

In the illustrative example, the annular ribs 72 on the outside of the casing projected outwardly beyond the casing the amount by which the small rib 70 was overhanging the groove 68. Thus where the smaller rib 70 was given a depth on the order of 0.027 inch, as a minimum, the ribs 72 were approximately twice that depth from the surface of the groove 68. In practice, the dimensions of ribs 72 may be somewhat greater and will vary from one engine to another in order to optimize the turbulence and differential pressure generated between the rib.

From a performance standpoint, significant increases in gas mileage were attributable directly to the use of the claimed fuel atomizer; and exhaust gas temperatures underwent a material reduction. In an independent testing laboratory exhaust gas analysis conducted on a car with and without the unit, the unit was found to bring about a substantial reduction in carbon monoxide and hydrocarbon exhausted. Thus, among its many other advantages, the unit of the present invention materially reduces the quantity of harmful pollutants released into the atmosphere with the ordinary internal combustion engine exhaust gases.

In the form shown in FIGS. 1 and 2, the discharge orifices may, if desired, be eliminated along that section of the wall of the casing 52 aligned directly below the delivery tube 40, since the air flow passing over the delivery tube is divided and will become relatively ineffective to aspirate fuel from those orifices directly beneath the tube as the airstream passes across the ribs 70 and 72. In addition, the liquid fuel may be drawn through the fuel delivery conduit without preliminary mixing with air through the air bleed passage 24 and can take on the necessary quantity of air through one or more air intake ports in the fuel delivery conduit located in the path of air flow through the main air induction passage.

In the modified form shown in FIGS. 3 and 4, like parts to those illustrated in FIGS. 1 and 2 are correspondingly enumerated. The conventional parts of the system are schematically illustrated and broadly consist of riser tube 28 communicating with the conduit 40, the latter having an air bleed 30 at one end and continuing inwardly to project across the path of airstream flowing through the throat 12 of the venturi section. In the modified form shown, the delivery conduit includes an enlarged sleeve 40' at its inner terminal end projecting through the side wall of an inner venturi 80 which is located concentrically within the throat 12 of the primary venturi. The inner venturi 80 includes an external cylinder wall surface 81 and an inner convex wall surface 82, the wall surfaces terminating at opposite ends in an upper flat circular end surface 83 and a lower flat circular end surface 84. Again, the venturi assembly with the fuel/air delivery means including the delivery conduit 40 thus far described is conventional and characteristic of many carburetor assemblies now in commercial use wherein the airstream passing across the terminal end of the delivery conduit 40 would normally reduce the mixed flow of fuel through the riser tube 28 and air through the intake 30 for discharge through the inner venturi assembly into the main airstream.

In accordance with the present invention, in order to increase the efficiency and performance of the engine, the inner venturi assembly is readily converted into a mixing device having the same essential features as the form of FIGS. 1 and 2. To this end, a circular end cap 86 defines a closure across the upstream end 83 of the inner venturi, and an end cap 87 forms a closure across the downstream end 84 of the inner venturi and is connected to an inner core 88 projecting downwardly from the upper end cap 86. Preferably, the end cap 86 has an external flange 90 adapted to seat on the end surface 83 of the inner venturi with a conical portion 91 tapering downwardly from the underside of the flange for disposition in close-fitting relation to the inner wall surface 82. The inner cylindrical core 88 projects downwardly from the conical portion 91 in inner spaced concentric relation to the inner wall surface 82, and the core widens into an enlarged lower cylindrical extremity 93 provided with an internally threaded counterbore 94 adapted to receive a connecting screw 95 inserted upwardly through the lower end cap 87.

A plurality of intake ports 97 are arranged in spaced circumferential relation through the thickness of the end cap intermediately between the tapered or conical surface of the portion 91 and the surface of the core 88 to permit the controlled introduction of air from the airstream through the annular chamber 98 formed between the core 92 and the inner wall surface 82.

In turn, the lower end cap 87 is of generally cup-shaped configuration and includes a generally circular body 99 provided with an inner cylindrical wall surface 100 and an upwardly tapered external wall surface 101, the latter adapted for insertion in close-fitting relation to the lower end of the inner wall surface 82. An annular rib 104 projects laterally and outwardly from the base of the tapered wall surface 101 beyond the external surface 81 of the venturi assembly, and a lower external flange 105 is spaced beneath the rib 104 to define a groove portion 106 therebetween. A row of discharge orifices 108 extends laterally through the thickness of the body 99 into communication with the groove portion 106, there being a plurality of small discharge orifices 108 arranged in closely spaced circumferential relation to one another around the outer periphery of the body.

The multiple air intake or bleed ports 97 accomplish the same function as the air intake port 44 in the form shown in FIGS. 1 and 2 to permit the controlled entry of air from the airstream into the chamber formed between the inner venturi and the end cap for intimate mixing with the fuel introduced through the delivery conduit 40 as a preliminary to discharge through the orifices 108. A single row of discharge orifices is illustrated, again in communication with a groove formed between the external ribs 104 and 105 so that a negative pressure differential is created across the orifices sufficient to induce the flow of fuel through the delivery conduit for mixture with air induced through the intake ports 97. The multiple ports 97 permit air to be introduced in sufficient quantities to form a relatively lean fuel/air mixture and to gasify the fuel for passage in a foamed state through the discharge orifices into the main airstream.

As a suitable alternative, air bleed tubes 109 shown dotted in FIG. 3 may be inserted in the air intake ports 97 to conduct the air downwardly through the chamber for mixture with the fuel in the lower restricted area of the chamber immediately above the discharge orifices so that foaming of the fuel takes place immediately prior to its discharge through the orifices 108 into the airstream.

In the modified form of invention shown in FIGS. 5 to 8, a mixing device 10'' is shown in connected relation to a venturi assembly identical to that shown in FIGS. 3 and 4 and again where the mixing device is affixed to the inner venturi assembly to control the metering and discharge of fuel into the airstream. In the modified form of invention, however, an end cap 110 is in the form of a solid core dimensioned to occupy the upper half of the inner venturi and has an inclined, recessed portion 112 which receives the discharge end 41 of the delivery conduit and a central bore 113 which permits insertion of an air bleed tube 114 extending downwardly beyond the lower end surface 115 of the end cap 110. In addition, the end cap 110 is provided with an external flange 116 seated upon the end surface 83 of the inner venturi assembly with a downwardly tapering external surface 117 inserted in close-fitting relation to the inner wall surface 82 of the inner venturi.

A lower end cap 120 is inserted upwardly through the opposite downstream end of the inner venturi assembly and has an upwardly extending inner core 121 provided with a tapered external wall surface 121' snugly engaging the inner wall surface 82 of the inner venturi with an external annular rib 122 projecting outwardly from the base of the tapered wall surface 121 beyond the external wall surface 81 of the inner venturi assembly. In a manner corresponding to the form of invention shown in FIGS. 3 and 4, the base of the lower end cap is provided with an external flange 123 in spaced relation beneath a rib 122 to form an intermediate groove 124 between the ribs. The inner core 121, which occupies the lower half of the venturi assembly has a central bore 126 in the upper end of the core which is aligned with the recess 112 to form a common central chamber communicating with the discharge end 40' of the delivery conduit. The lower extremity of the air bleed tube 114 extends into the bore 126, the tube being closed at its lower end and a plurality of air bleed openings 127 are provided at spaced intervals along the wall of the tube 114 adjacent to its closed end. Downwardly inclining bores or grooves 128 extend laterally away from the bottom of the central bore 126 into communication with a series of discharge orifices 130 which, as best seen from FIG. 8, are arranged in closely spaced relation to one another circumferentially about the lower end of the end cap and extend laterally from the lower ends of the inclined bores 128 into communication with the external groove 124.

In the operation of the mixing device 10'', the fuel is supplied with limited amounts of air, as in other forms, through the delivery conduit into the central chamber formed between the end caps, and air is directed from the airstream through the tube 114 for expulsion through the openings 127 at right angles to the path of flow of the fuel through the central chamber. Again the tube 114 is sized to deliver sufficient quantities of air into the chamber to foam the fuel in its movement through the inclined bores 128 under the negative pressure differential developed across the discharge orifices 130. In turn, the orifices 130 are sized to meter the fuel and maintain it in a foamed state as it is discharged at a high velocity laterally and outwardly into the airstream.

In each of the forms described, the air bleed ports 24 or 30 communicating with the leading end of the fuel delivery conduit, may be eliminated and the entire source of air furnished by the intake ports in the main air induction passage. In this relation, it will be noted that in each case the air is drawn from the airstream substantially at right angles to the direction of flow of the fuel so as to establish the most favorable conditions for mixing with the fuel as well as foaming the fuel as a direct preliminary to its discharge through the discharge orifices. It will be evident that in each of the forms shown in FIGS. 3 to 8, intake and discharge ports corresponding to the ports 44 and 46 may be positioned in the fuel delivery conduit for the direct introduction of fuel into the airstream at idling; or the conventional means of fuel supply at idling in the carburetor may be utilized.

Although the present invention has been described with a certain degree of particularity, it is understood that the present disclosure has been made only by way of example and that changes in details of structure and system components may be made without departing from the spirit of the invention.

What is claimed is:

1. A device for regulating a fuel/air mixture delivered into the main air induction passage of an internal combustion engine comprising:
   a fuel supply source,
   a fuel delivery conduit extending from said source into the air induction passage, said delivery conduit including at least one air intake port, and
   discharge means positioned within the air induction passage and including an annular chamber in communication with said delivery conduit having a plurality of laterally and outwardly extending discharge orifices and air-flow responsive means defined by an external annular rib disposed upstream of said discharge orifices responsive to the flow of air through the air induction passage to establish a negative pressure differential across said discharge orifices of sufficient magnitude to induce the flow of fuel from said fuel supply source and air from the air intake port through said delivery conduit and said discharge means, said orifices being sized for discharge of the fuel and air in metered quantities into the airstream flowing through the air induction passage.

2. A device according to claim 1, said annular chamber having said discharge orifices extending laterally in closely spaced, circumferential relation through the outer wall of said chamber downstream of the delivery conduit to discharge the fuel/air mixture from the delivery conduit laterally in a foamed state into the path of air flow through the main air induction passage.

3. A device according to claim 2, said air intake port being located on said device in the path of air flow through the main air induction passage and upstream of said discharge orifices.

4. A device according to claim 3, said air intake port located in the delivery conduit and facing upstream into the path of air movement through the air induction passage.

5. In a device for regulating the quality of a fuel/air mixture delivered into the main air induction passage of a carburetor, the combination comprising:
   a fuel supply source,
   a fuel delivery conduit extending from said fuel supply source into the main air induction passage, and
   an induction chamber located concentrically within said passage with the terminal end of said fuel delivery conduit communicating with said induction chamber, said induction chamber provided with a plurality of discharge orifices extending laterally and outwardly in closely spaced relation to one another,
   air intake openings in the path of air flow through the main air induction passage located upstream of said discharge orifices whereby the passage of air through the main air induction passage externally of said chamber is operative to induce the flow of fuel from said fuel supply source and of air through the intake openings, said discharge orifices being sized with respect to said intake openings to promote foaming of the fuel/air mixture within the induction chamber preliminary to discharge in predetermined quantities through said discharge orifices.

6. In a device according to claim 5, said discharge orifices each being of limited size with respect to the size of each of the air intake openings.

7. In a device for regulating a fuel/air mixture delivered into the main air induction passage of an internal combustion engine, a fuel supply source, a fuel delivery conduit extending from said fuel supply source into the main air induction passage and across the path of air flow through the passage, said conduit provided with at least one air intake port in the path of air flow through the main air induction passage, and discharge means communicating with said conduit responsive to the flow of air through said air induction passage to induce the mixed flow of fuel from said fuel supply source and of air through said intake port and to meter same for discharge into the airstream flowing through the air induction passage, said fuel delivery conduit further including a discharge port cooperating with said air intake port to discharge a fuel/air mixture into the main air induction passage at lower velocities of air flow through the main air induction passage ahead of said discharge means.

8. In a device according to claim 7, said air intake port opening upstream with respect to the direction of air movement through the main air induction passage and said discharge port aligned with said intake port downstream thereof whereby the airstream flowing therethrough and around said conduit at the lower air velocities is operative to withdraw fuel from said conduit and discharge same into the main air induction passage.

9. In a device according to claim 8, said discharge port being further operative at higher velocities of air flow through the main air induction passage to introduce air into said conduit for intermixture with the fuel induced to flow through said conduit for discharge by said discharge means.

10. In a device according to claim 9, said discharge port being flared outwardly in the direction of air flow through the main air induction passage.

11. In a device according to claim 10, said discharge means including laterally outwardly directed orifices downstream of said air intake port within the main air induction passage.

12. The method for mixing and foaming liquid fuel and air in the airstream of a main air induction passage of an internal combustion engine comprising the steps of inducing the flow of liquid fuel through a delivery conduit traversing the flow of air through the air induction passage, introducing air from the air induction passage into the delivery conduit directly ahead of the discharge of fuel into the air induction passage directing the fuel and air through a restricted passage bounded by an irregular surface in sufficient quantities to convert the fuel into a foamed state, metering the foamed fuel laterally and outwardly through a plurality of discharge orifices of limited size with respect to the size of the fuel delivery conduit across the path of the airstream in discharging the fuel into the air induction passage.

13. The method according to claim 12 further including the step of withdrawing fuel from the fuel delivery conduit at lower velocities of air flow through the main air induction passage ahead of its point of discharge from the conduit at higher air velocities.

14. The method according to claim 13 characterized by discharging the foamed fuel and air laterally into the airstream in a restricted throat region of the main air induction passage.

15. The method according to claim 14 further characterized by introducing air from the air induction passage into the delivery conduit at right angles to the direction of flow of the fuel through the conduit.

16. A fuel atomizer for internal combustion engines which comprises a delivery tube having an intake end adapted to receive raw fuel from a discharge port in the mouth of a carburetor and deliver same to a point adjacent the center of high velocity air movement therethrough; a hollow cylindrical casing connecting to receive fuel from the discharge end of the delivery tube through an intake port in the upper end thereof when positioned in the throat of a carburetor in coaxial relation thereto, said casing having a cup-shaped cavity therein open at one end, a plurality of angularly spaced discharge orifices near the lower end communicating with the interior of said cavity, and an external annular rib located upstream of said discharge orifices in overhanging relation thereto; and, a core within the cup-shaped cavity in the casing cooperating therewith to define an annular chamber closed at both ends and connected to receive fuel from the delivery tube, said annular rib cooperating with the high velocity airstream flowing thereover to establish a negative differential pressure across the discharge orifices of sufficient magnitude to aspirate fuel from the annular chamber and atomize same within the throat of the carburetor.

17. A fuel atomizer for internal combustion engines which comprises a delivery tube having an intake end adapted to receive fuel from a discharge port in the mouth of a carburetor and deliver same to a point adjacent the center of high velocity air movement therethrough, said tube having an air intake port intermediate its ends opening upstream with respect to the direction of air movement and a flared discharge orifice aligned with said intake port downstream thereof, said port and orifice so operating with one another and with the airstream flowing therethrough and around said tube to withdraw fuel from the latter and break it up into a mist of minute fluid particles at relatively low engine speeds preparatory to delivering same to the throat of the carburetor; a hollow cylindrical casing connected to receive fuel from the discharge end of the delivery tube through an intake port in the upper end thereof when positioned in the throat of a carburetor in coaxial relation thereto, said casing having a cup-shaped cavity therein open at one end, a plurality of angularly spaced discharge orifices near the lower end communicating the interior of said cavity, and an external annular rib located adjacent said discharge orifices in overhanging relation thereto; and, a core within the cup-shaped cavity in the casing cooperating therewith to define an annular chamber closed at both ends and connected to receive fuel from the delivery tube, said annular rib cooperating with the high velocity airstream flowing thereover to establish a negative differential pressure across the discharge orifices of sufficient magnitude to aspirate fuel from the annular chamber and atomize same within the throat of the carburetor.

18. The fuel atomizer as set forth in claim 17 in which the casing is provided with an external annular groove below the annular rib, and the discharge orifices are arranged in a circumferential row in the bottom of said groove.

19. The fuel atomizer as set forth in claim 17 in which the external surface of the core is provided with a plurality of spaced parallel grooves cooperating to define annular ribs therebetween adapted to break up the liquid fuel flowing thereacross into minute droplets preparatory to their being sucked from the annular chamber through the discharge orifices.

20. The fuel atomizer as set forth in claim 17 in which the casing contains at least two external annular grooves located in spaced parallel relation to one another beneath the annular rib, adjacent pairs of said grooves cooperating with one another to define additional annular ribs therebetween, and in which a row of angularly spaced discharge orifices is located in the bottom of each annular groove.

21. The fuel atomizer as set forth in claim 17 in which the area of the casing directly underneath the delivery tube is devoid of discharge orifices.

22. The fuel atomizer as set forth in claim 17 in which the wall of the cup-shaped cavity in the casing is smooth-surfaced and substantially cylindrical, the core is cylindrical and provided with a plurality of spaced parallel grooves.

23. The fuel atomizer as set forth in claim 18 in which the upper wall of the annular groove and the lower wall of the annular rib are essentially coplanar.

24. The fuel atomizer as set forth in claim 20 in which the casing includes two external annular grooves arranged in spaced parallel relation one above the other defining a second external annular rib therebetween, the upper groove of said pair thereof lying immediately adjacent the first external annular rib, and the lower groove of said pair being spaced above the bottom of the casing so as to define a third external annular rib therebeneath.

(References on following page)

References Cited

UNITED STATES PATENTS

| | | | |
|---|---|---|---|
| 1,254,659 | 1/1918 | Coulombe. | |
| 1,630,410 | 5/1927 | Stevenson | 261—118 |
| 1,737,496 | 11/9129 | Feroldi | 261—41 X |
| 1,758,954 | 5/1930 | Linn | 261—41 X |
| 1,855,383 | 4/1932 | Capell. | |
| 1,941,658 | 1/1934 | Bucherer | 261—49 |
| 1,949,031 | 2/1934 | Weber | 261—34 |
| 1,966,449 | 7/1934 | Kennedy | 261—49 |
| 1,982,945 | 12/1934 | Armstrong | 261—41 |
| 2,087,293 | 7/1937 | Olson | 261—62 |
| 2,273,979 | 2/1942 | Mock | 261—78 X |
| 1,895,470 | 1/1933 | Mathieu. | |
| 2,275,691 | 3/1942 | Simanton | 239—425 |
| 2,310,984 | 2/1943 | Mock et al. | 261—69 |
| 2,375,160 | 5/1945 | Woods | 261—44 |
| 2,704,659 | 3/1955 | Fuchs | 261—75 |
| 2,957,683 | 10/1960 | Eberhardt | 261—41 |
| 3,326,539 | 6/1967 | Phipps | 261—41 |

FOREIGN PATENTS

| | | |
|---|---|---|
| 1,010,806 | 3/1952 | France. |
| 246,489 | 1/1927 | Great Britain. |
| 558,291 | 12/1943 | Great Britain. |
| 734,400 | 7/1955 | Great Britain. |

TIM R. MILES, Primary Examiner

U.S. Cl. X.R.

261—78 R, 118, 121 A, DIG 39